United States Patent
Cardona

(10) Patent No.: US 9,408,059 B2
(45) Date of Patent: Aug. 2, 2016

(54) METHOD AND APPARATUS FOR COMMUNICATING BETWEEN MOBILE DEVICES

(71) Applicant: Javier Cardona, San Francisco, CA (US)

(72) Inventor: Javier Cardona, San Francisco, CA (US)

(73) Assignee: TERRANET AB, Lund (SE)

( * ) Notice: Subject to any disclaimer, the term of this patent is extended or adjusted under 35 U.S.C. 154(b) by 360 days.

(21) Appl. No.: 13/851,746

(22) Filed: Mar. 27, 2013

(65) Prior Publication Data

US 2014/0219260 A1    Aug. 7, 2014

Related U.S. Application Data

(60) Provisional application No. 61/761,142, filed on Feb. 5, 2013.

(51) Int. Cl.
*H04W 8/00* (2009.01)
*H04L 12/58* (2006.01)
*H04W 4/02* (2009.01)

(52) U.S. Cl.
CPC .............. *H04W 8/005* (2013.01); *H04L 51/20* (2013.01); *H04W 4/02* (2013.01)

(58) Field of Classification Search
CPC ....... G06Q 10/10; G06Q 50/01; G06Q 30/02;
H04W 4/02; H04W 4/023; H04W 4/206;
H04W 8/005; H04W 84/22; H04W 4/08;
H04L 67/104; H04L 67/306; H04L 67/18;
H04L 67/1068; H04L 51/32; H04L 67/04;
H04L 51/20; H04L 51/38
See application file for complete search history.

(56) References Cited

U.S. PATENT DOCUMENTS

| | | | |
|---|---|---|---|
| 2008/0183853 A1* | 7/2008 | Manion et al. | 709/223 |
| 2011/0113084 A1* | 5/2011 | Ramnani | 709/201 |
| 2011/0125850 A1* | 5/2011 | Rahnama et al. | 709/205 |
| 2011/0238751 A1* | 9/2011 | Belimpasakis et al. | 709/204 |
| 2012/0309417 A1* | 12/2012 | Blom et al. | 455/456.1 |
| 2013/0014006 A1* | 1/2013 | Abellera et al. | 715/234 |
| 2013/0132484 A1* | 5/2013 | Berezecki | 709/205 |

* cited by examiner

*Primary Examiner* — Yee Lam

(74) *Attorney, Agent, or Firm* — Blakely, Sokoloff, Taylor & Zafman LLP

(57) ABSTRACT

A method and apparatus is disclosed herein for communicating between mobile devices. In one embodiment, the method comprises launching an application on a first mobile device, joining a wireless mesh network with the first mobile device being a node in the wireless mesh network in response to launching the application, discovering one or more other mobile devices that are active in the wireless mesh network using a discovery protocol, receiving profile information from each of the one or more other mobile devices, and displaying a visual directory of participants associated with the one or more other mobile devices active in the wireless mesh network.

19 Claims, 10 Drawing Sheets

METHOD AND APPARATUS FOR COMMUNICATING BETWEEN MOBILE DEVICES

PRIORITY

The present patent application claims priority to and incorporates by reference the corresponding provisional patent application Ser. No. 61/761,142, titled "FACE2NAME," filed on Feb. 5, 2013.

FIELD OF THE INVENTION

Embodiments of the present invention related to mobile device communication. More particularly, embodiments of the present invention relate to using a mesh network for communication between mobile devices attending an event to facilitate socializing and networking among participants.

BACKGROUND OF THE INVENTION

Many situations exist in which identifying and communicating with other people that are in the same place at the same time is desired by individuals. These places include, for example, a network event (e.g., professional conference), a shopping mall, entertainment club, a vacation establishment (e.g., a cruise ship), and a university campus.

There are solutions that exist to facilitate communication among individuals in these settings. However, they include a number of drawbacks. One such solution uses a central server to facilitate the communication. To enable communication, all the users have to enter their information into the central server and then all communications thereafter have to go through the central server. If the central server become goes down and is no longer operational, then all communication is stopped. Thus, it would be desirable to have a solution that doesn't rely on a central server for all communications.

SUMMARY OF THE INVENTION

A method and apparatus is disclosed herein for communicating between mobile devices. In one embodiment, the method comprises launching an application on a first mobile device, joining a wireless mesh network with the first mobile device being a node in the wireless mesh network in response to launching the application, discovering one or more other mobile devices that are active in the wireless mesh network using a discovery protocol, receiving profile information from each of the one or more other mobile devices, and displaying a visual directory of participants associated with the one or more other mobile devices active in the wireless mesh network.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
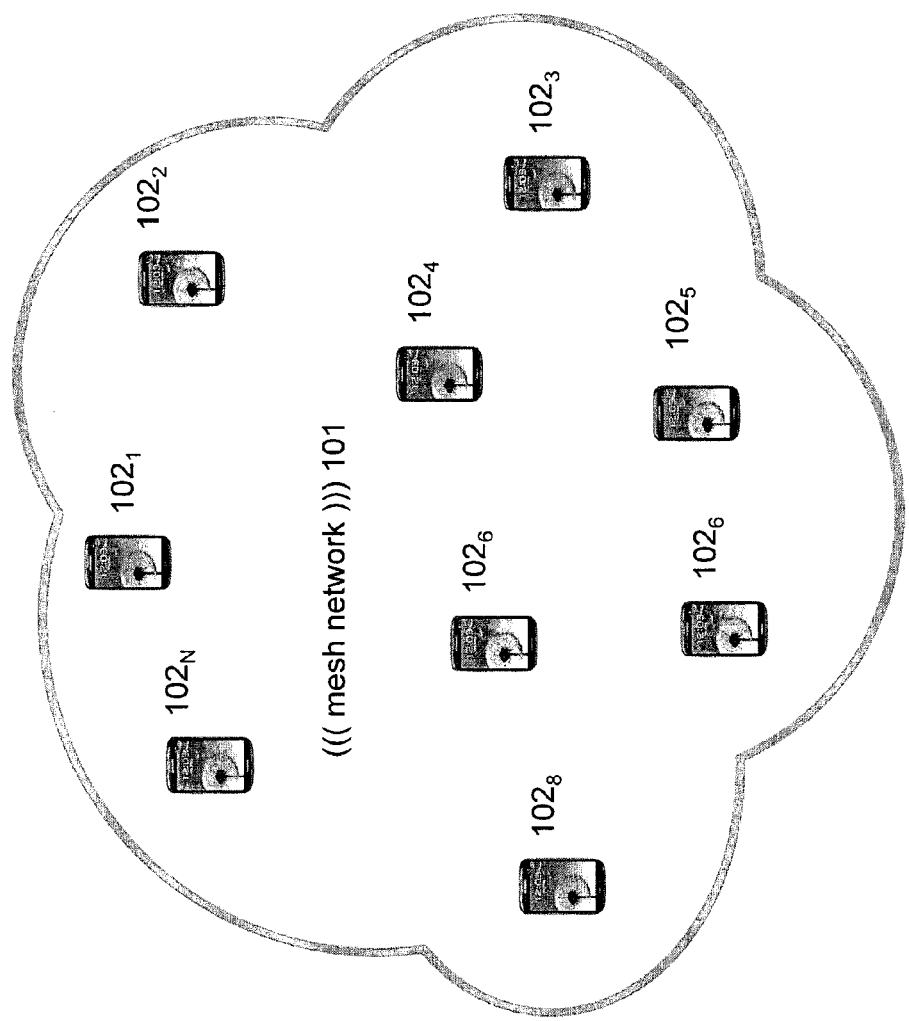
FIG. 1 illustrates one embodiment of a wireless mesh network.

A method and apparatus for using a mesh network for communication between mobile devices attending an event or being at a location to facilitate socializing, networking, or other forms of interaction among participants.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A wireless mesh network having multiple mobile devices (e.g., mobile phones, tablets, etc.) that communicate with each other without using a central server is described. FIG. 1 illustrates one embodiment of a mesh network 101 with mobile devices $102_{1-N}$. Mobile devices $102_{1-N}$ communicate with each other when they are within each other's vicinity using mesh network 101.

In one embodiment, the mobile devices join the mesh network by sending announcement messages that announce or advertise their presence. Each mobile device discovers other mobile devices in mobile devices that are within their vicinity (e.g., within a predetermined distance, within range of the announcement messages, etc.). In one embodiment, each of the devices represents a node in the mesh network and has a unique ID derived from the MAC address of its wireless interface. Therefore, there is a unique ID associated with every one of those nodes. This unique ID facilitates the mobile device being recognized as a previous member of the mesh network in case the mobile device leaves and then rejoins the network.

In one embodiment, each mobile device is operable to receive profile information from the other mobile devices and display a visual directory of participants having mobile devices that are active in the wireless mesh network.

Using the visual directory, a user can select a thumbnail image of one participant from the visual directory and have a contact page of that participant be displayed on their mobile device. In one embodiment, the contact page includes the thumbnail image, a user's name and a list of one or more options for contacting the user (e.g., a talk button to make a call to that participant, a chat button to start a chat session with the participant, etc.).

Thus, the mobile devices share profile information with each other at a venue when they are in a wireless mesh network together and this shared information can be used to facilitate further communication and interaction with each other at the venue.

In one embodiment, if a mobile device in the wireless mesh network becomes inactive, the rest of the mobile devices in the network can continue to communicate with each other without breaking the wireless mesh network between the one mobile device and mobile devices that remain active in the wireless mesh network. In one embodiment, if at least two mobile devices becomes inactive in the wireless mesh network without breaking the wireless mesh network between the remaining mobile devices, then those mobile devices that split from the others form their own group with their own wireless mesh network, while those mobile device that remain form a second group with their own wireless mesh network. This occurs in a seamless fashion. Subsequently, the two groups can be rejoined into one wireless mesh network when mobile devices in the first and second groups are within a predetermined distance of each other (e.g., back within the vicinity of each other).

In one embodiment, the mesh network software used by each of the mobile devices is open80211s, the open mesh stack that is part of the Linux kernel version 3.8.

More specifically, in one embodiment, the platform running on each mobile device is always monitoring its link layer as part of a discovery protocol that is being used. Each mobile device announces or advertises itself and each mobile device monitors its link layer to determine when another mobile device is in the area (based on received advertising messages). When a new device becomes available, the new device broadcasts its profile information, which the other mobile devices in the mesh network obtain and display. Once a mobile device has been discovered, the mobile device that made the discovery maintains a list of all the mobile devices for which it is still communication and maintains profile information for each of the mobile device, which is received from each mobile device directly as part of the process. If the new device was a device that had previously been part of the group, the mobile devices recognize that this new mobile device was previously in the mesh network and displays their profile information again.

In one embodiment, the mesh uses a path selection protocol when a mobile device wants to communicate with another mobile device in the wireless mesh network. In this case, the mobile device sends a broadcast message that queries how to reach that other mobile device. In one embodiment, the path selection protocol computes a metric and creates a topology that can be used to determine a route for the communication when it needs to do so. Any message will then be forward along that determined route. In one embodiment, if the message is being sent through multiple mobile devices to reach its destination, then the message contains information indicating to the mobile devices that receive it that they need to forward the message onward to its destination.

As discussed above, in one embodiment, the mobile devices that are part of the wireless mesh network group can split into multiple groups. For example, if a mobile device moves to out of the range of the mobile devices in the wireless mesh network, then communication with those mobile devices stops. If multiple mobile devices that were in the group go out of range of other of those mobile devices, but then are still within range of each other, then the mobile devices in the mesh network are essentially split into two (or more) groups. Note that the present invention is not limited to splitting the group into two groups. In fact, a group may be split into any number of groups.

When a mobile device leaves the group, the other mobile devices stop receiving the announcements from that mobile device and remove it from the list of devices. In response to this occurring, notifications are sent through the application causing the mobile device to provide an indication that the mobile device is no longer available. In one embodiment, the indication is provided by changing the user interface (e.g., grey out the user's profile information on the display).

When any mobile devices of a group that has been split away from a mesh network are back within range, they automatically and seamlessly rejoin the group from which they split. This seamless rejoining does not require any reconnection process to occur because there was never a connection that was broken.

In one embodiment, in order to reestablish communication, a messaging library is used. In one embodiment, the library is zeromq.

The use of the wireless mesh network has a number of advantages. For example, this communication paradigm does not require the use of a central server or a central network node, such as in WiFi and WiFi Direct to handle the communications. In the case of WiFi and WiFi Direct, even if there is no central server, the entire network freezes if the Access Point or the Group Owner fails or becomes unreachable. Mesh does not suffer from that single point of failure and communications are made directly between the mobile devices in the network. Also, using the wireless mesh network avoids having to access the infrastructure WiFi network. Another advantage is that people can dynamically sign in and out of the network. Furthermore, only those mobile devices in the vicinity have access to the wireless mesh network, and therefore, there is no need for complicated security.

In one embodiment, as an alternative to using a wireless mesh network, the wireless communication scheme that is used is WiFi Direct+TDLS (Tunneled Direct Link Setup).

One Embodiment of a Communication Process

Figure 2:
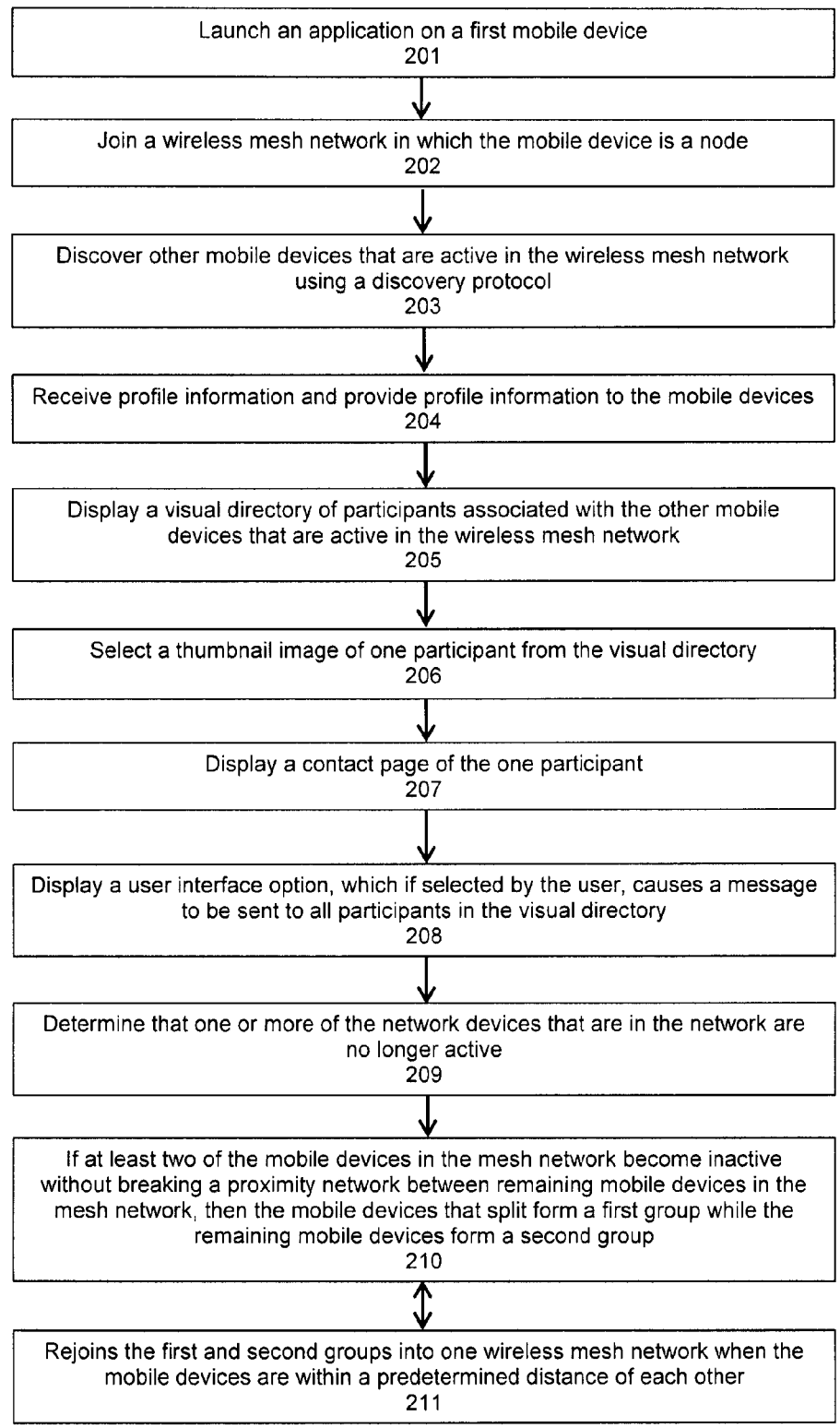
FIG. 2 is a flow diagram of one embodiment of a process for communicating between mobile devices attending an event to facilitate socializing and networking among participants.

FIG. 2 is a flow diagram of one embodiment of a process for communicating between mobile devices attending an event to facilitate socializing and networking among participants. The process is performed by processing logic that may comprise hardware (circuitry, dedicated logic, etc.), software (such as is run on a general purpose computer system or a dedicated machine), or a combination of both. In one embodiment, the process is performed by processing logic of a mobile device such as one of the mobile devices shown in FIG. 1.

Referring to FIG. 2, the process begins by processing logic in a mobile device launching an application on a first mobile device (processing block 201). In response to launching the application, processing logic in the mobile device joins a wireless mesh network in which the mobile device is a node (processing block 202). In one embodiment, joining a wireless mesh network with the first mobile device being a node in the wireless mesh network comprises advertising, by the first mobile device, its presence in the wireless mesh network.

As part of being in the wireless mesh network, processing logic in the mobile device discovers other mobile devices that are active in the wireless mesh network using a discovery protocol (processing block 203). In one embodiment, the processing logic discovers the other mobile devices only if each are within a predetermined distance of the mobile device.

Figure 3:
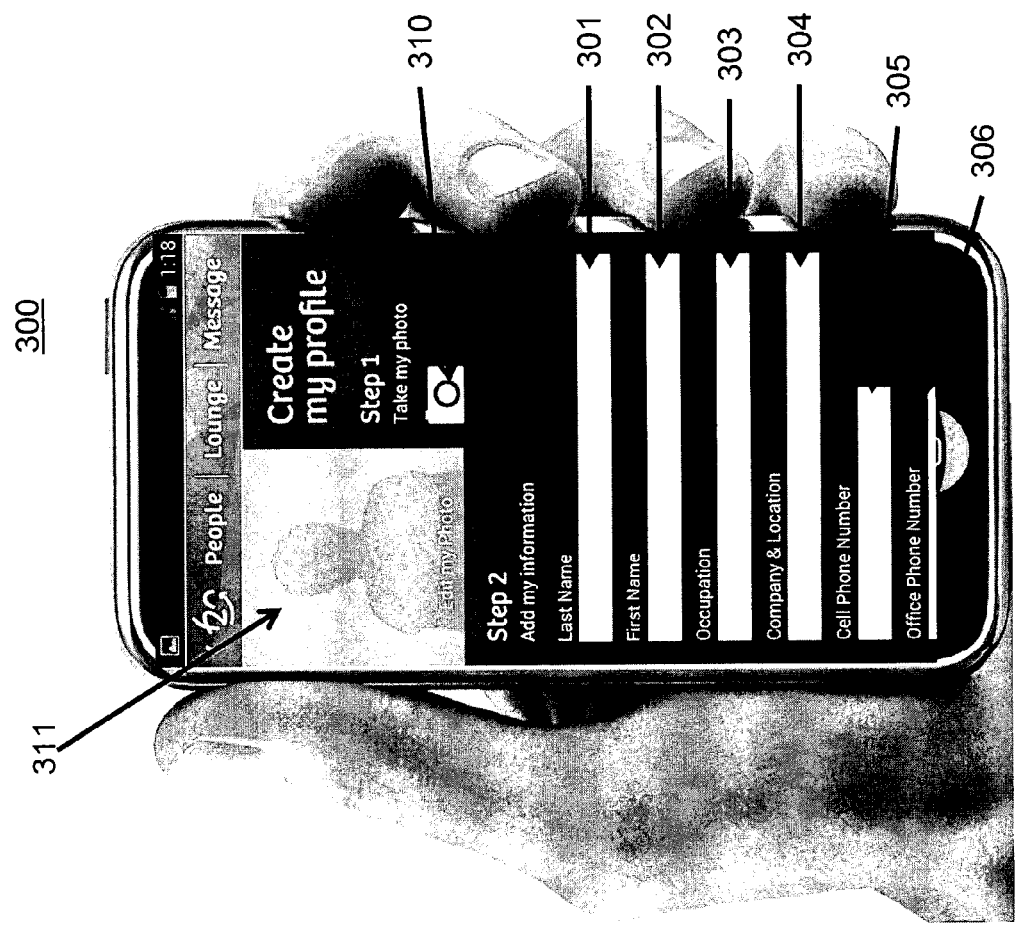
FIG. 3 is one embodiment of a personal profile page.

From those discovered mobile devices, processing logic in the mobile device receives profile information and provides its profile information to the mobile devices (processing block 204). In one embodiment, the user enters their profile information into a profile page that appears on the display of the mobile device on the first launch of the application. FIG. 3 is one embodiment of a personal profile page. Referring to FIG. 3, profile page 300 includes a location for a photo 311. Photo 311 may be obtained by take a picture with camera in response to pressing button 310. Profile page 300 also includes fields for a last name 301, first name 302, occupation 303, company & location 304, cell phone number 305, and office phone number 306. The present invention is not limited to these fields and other fields for other information may be used. In one embodiment, the fields in the display can be tailored based on preferences.

Figure 4:
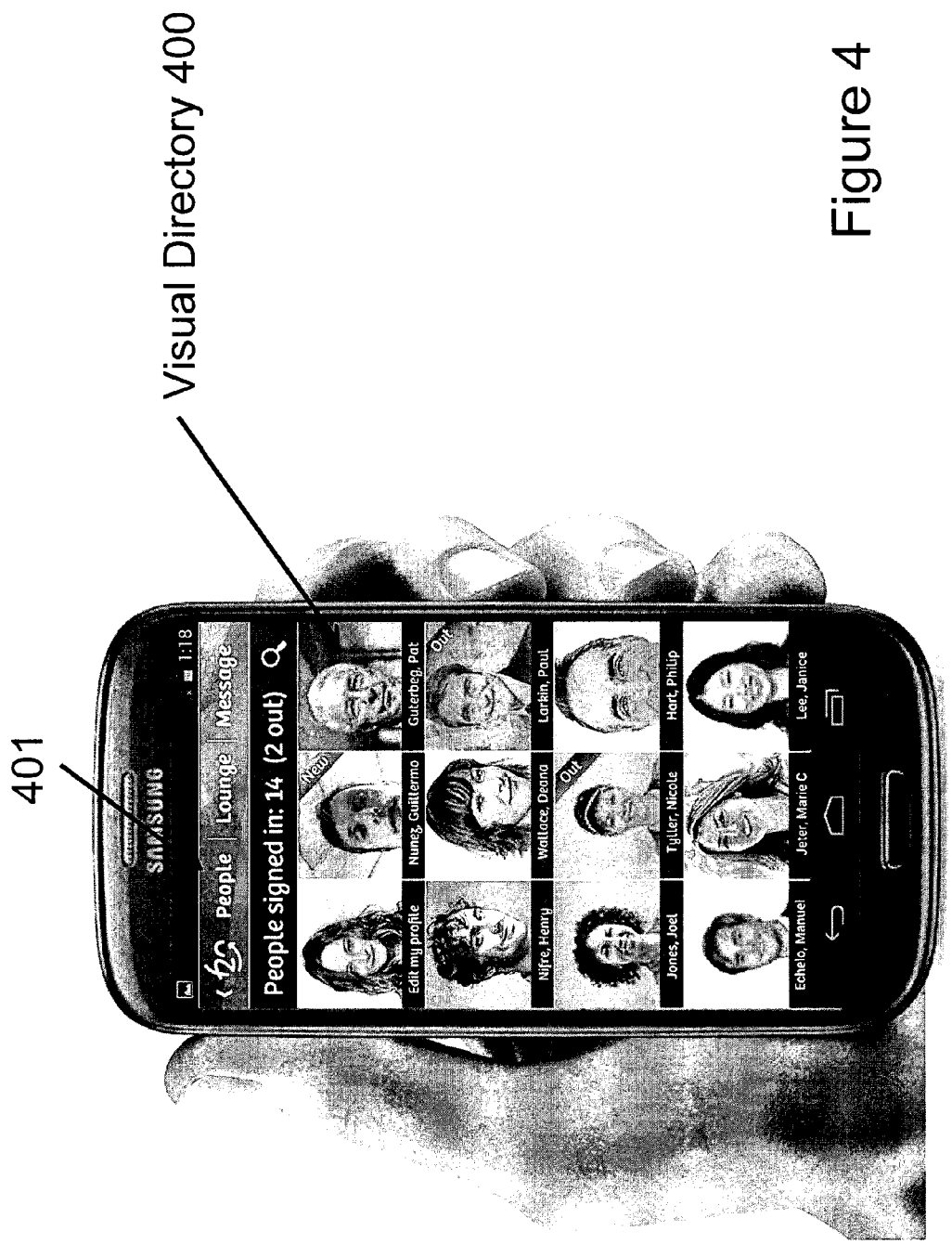
FIG. 4 illustrates one embodiment of a visual directory.
Figure 5:
FIG. 5 illustrates one embodiment of a carousel version of the visual directory.

Using the received profile information, processing logic displays a visual directory of participants associated with the other mobile devices that are active in the wireless mesh network (processing block 205). The visual directory allows users to browse through pictures of other users active in the wireless mesh network. In one embodiment, the visual directory is only displayed after the user selects a user interface element (e.g., presses a people button) on the display. FIG. 4 illustrates one embodiment of a visual directory. Referring to FIG. 4, visual directory 400 is displayed after the user presses a people button 401 on the display. In one embodiment, when the mobile device is held vertically, the participants are displayed in the grid format shown in FIG. 4. In one embodiment, the user can scroll up or down through the thumbnail images to see who is in the local area. In one embodiment, if the mobile phone is turned horizontally, a carousel version of the visual directory is displayed. FIG. 5 illustrates one embodiment of a carousel version of the visual directory. In one embodiment, the carousel version of the visual directory displays larger pictures of the users that are intended to be examined one at a time. In one embodiment, the user is able to flip through the images with a horizontal side-to-side movement of their thumb or finger.

In one embodiment, using mesh (and also, in a more limited way, with WiFi Direct+TDLS), the mobile device infers the distance to each other mobile device in the network from the received signal strength detected from that user's mobile device. The mobile device uses this information to sort the visual directory based on distance from the user. In one embodiment, the mobile device determines the distance between itself and each of the other mobile devices and sets up alerts to provide a notification when a person of interest is within a predetermined distance (e.g., "please alert me if this person comes within 2 meters from where I am").

Figure 6:
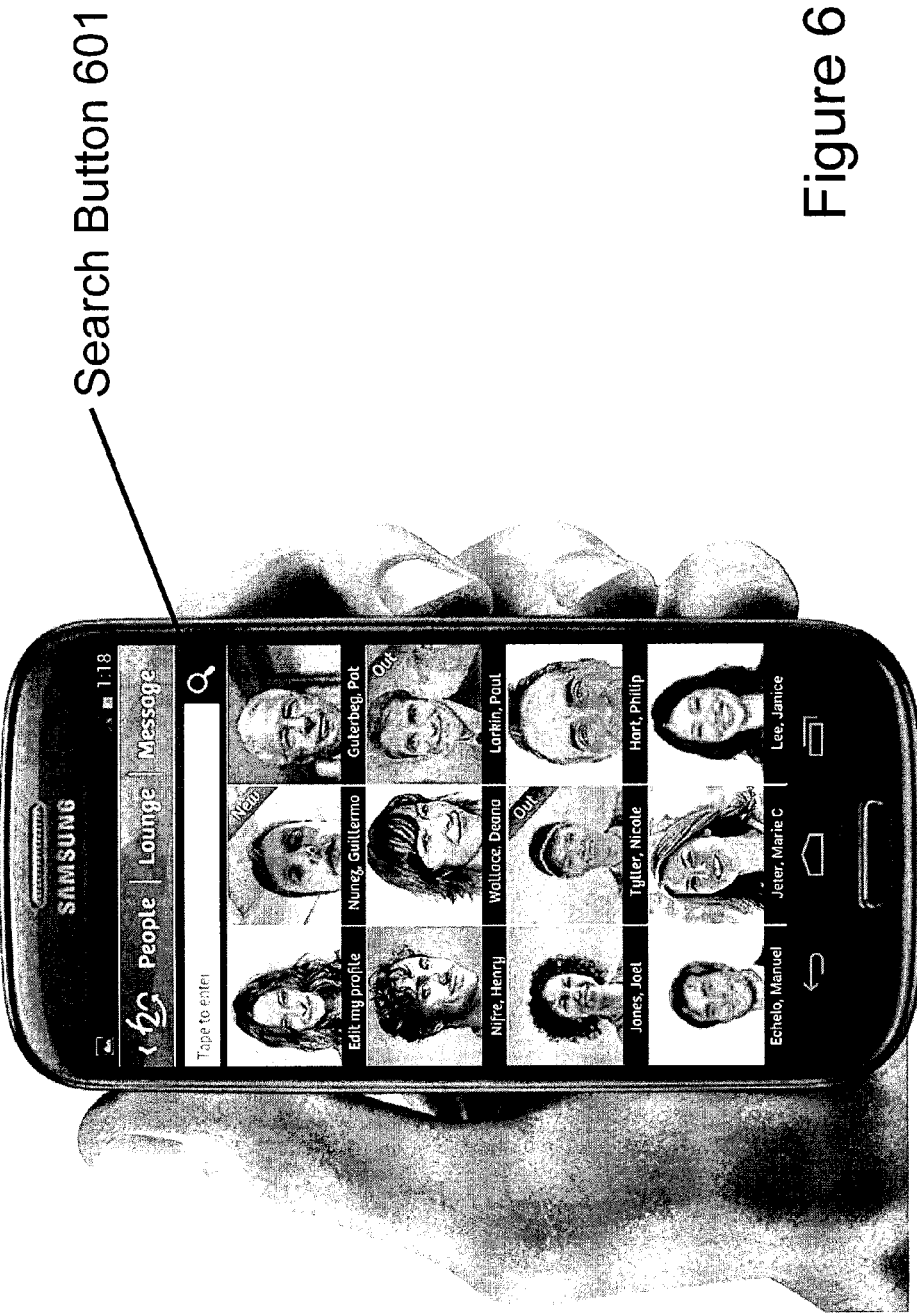
FIG. 6 illustrates one embodiment of a search window and associated search button.

In one embodiment, the user is able to search for an individual or search the profile information using keywords. This may be performed using a search button and its associated search window. Such searching capability allows a user to search for a person by name. FIG. 6 illustrates one embodiment of a search window and associated search button. Referring to FIG. 6, search button 601 is shown at the upper portion of the display of the mobile device. In one embodiment, the search button is placed in the navigation bar to ensure it is always available from anywhere in the application.

Figure 7:
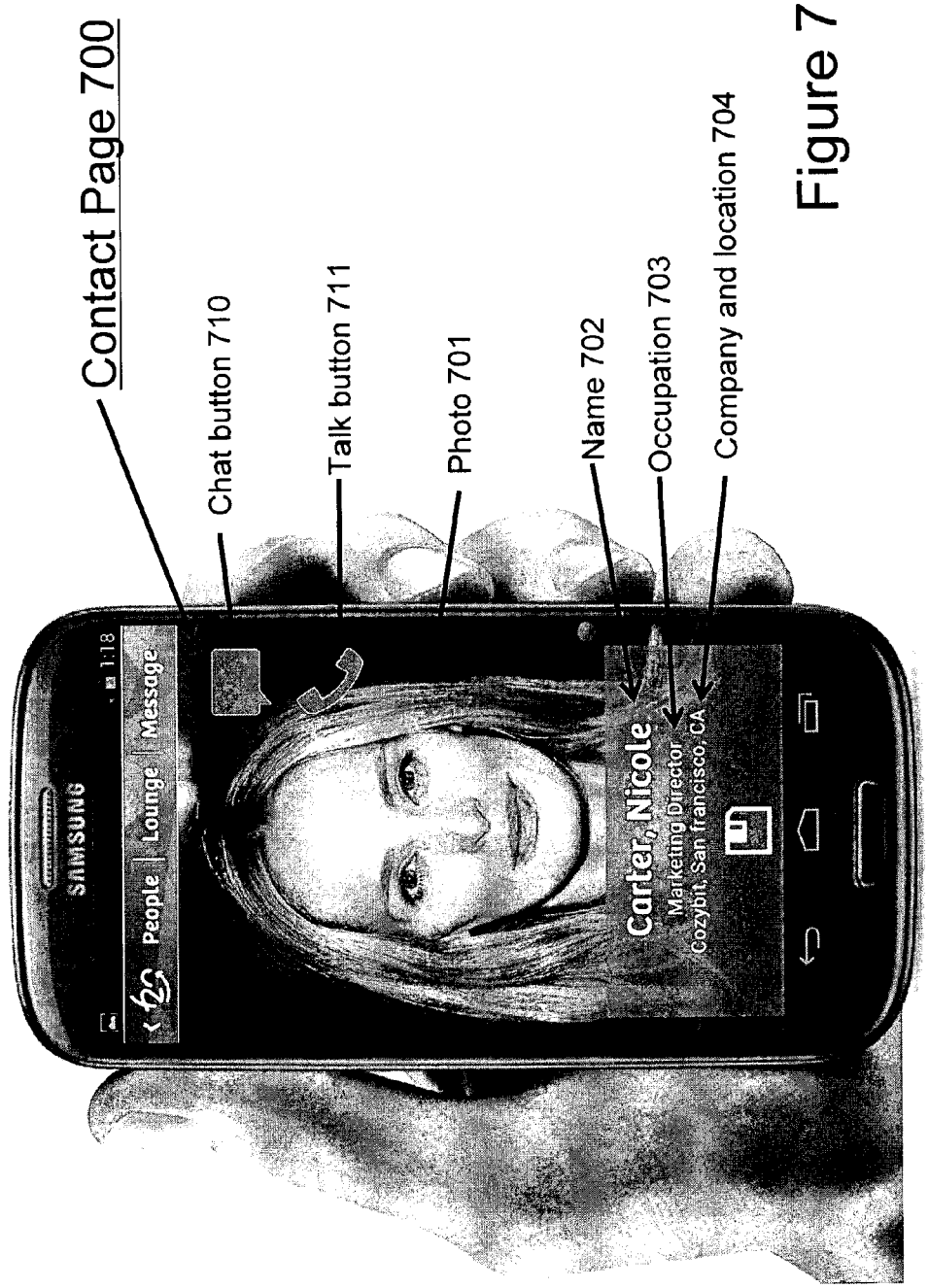
FIG. 7 illustrates one embodiment of a contact page.

Processing logic selects a thumbnail image of one participant from the visual directory (processing block 206). In response to the selection of a thumbnail image, processing logic displays a contact page of the one participant (processing block 207). In one embodiment, the contact page includes the thumbnail image of a mobile device user, that user's name and a list of one or more options for contacting that user. FIG. 7 illustrates one embodiment of a contact page. Referring to FIG. 7, contact page 700 includes a user's photo 701, name 702, occupation 702 and place of employment 704. In one embodiment, contact page 700 also includes a list of options to contact the user, such as chat button 710 and talk button 711. In response to selecting chat button 710, processing logic in the mobile device initiates a chat session with that user. In response to selecting talk button 711, processing logic in the mobile device initiates a telephone call to that user. In one embodiment, the telephone call occurs over the mesh network.

Figure 8:
FIG. 8 illustrates one embodiment of the user interface having people, lounge, and message buttons.
Figure 9:
FIG. 9 illustrates one embodiment of a message interface.

Processing logic also displays a user interface option, which if selected by the user, causes a message to be sent to all participants in the visual directory (processing block 208). In one embodiment, this occurs in response to pressing a "lounge" button on the user interface. Pressing the lounge button opens a group chat among the participants in the mesh network. FIG. 8 illustrates the lounge button 801. Pressing the message button 802 on the user interface causes a message board to be displayed. Upon selecting a message, the user is able to send messages and/or response to messages that have been received. FIG. 9 illustrates one embodiment of a message interface.

At a certain point in time after joining the wireless mesh network, processing logic determines that one or more of the network devices that are in the network are no longer active (processing block 209). This may be because those mobile device users closed their application that enabled them to provide announcement messages to the other user devices in the wireless mesh network. Alternatively, this may be because those mobile devices are outside the range of the wireless mesh network. Even when this occurs, the wireless mesh network that exists between the remaining mobile devices is not broken, and communication between the remaining mobile devices still occurs.

In one embodiment, if at least two of the mobile devices in the mesh network become inactive without breaking a proximity network between the first mobile device and remaining mobile devices in the mesh network, then those two or more mobile devices form a first group that is in a first wireless mesh network while the mobile devices that remain form a second group that is in a wireless mesh network together (processing block 210). Thus, in such a case, there are two (or more) groups of mobile devices with the separate wireless mesh networks. Subsequently, processing logic rejoins the first and second groups into one wireless mesh network when the mobile devices are within a predetermined distance of each other (e.g., within the range to receive the announcement messages of mobile devices in the other group) (processing block 211).

Note in one embodiment, when the mobile device is no longer active in the wireless mesh network, their profile picture in the visual directory may be removed or an effect may be applied to their profile picture. The effect may be applying a color (e.g., grey) to the picture to indicate to the user that the individual is not longer in the vicinity.

An Example of a Mobile Device

Figure 10:
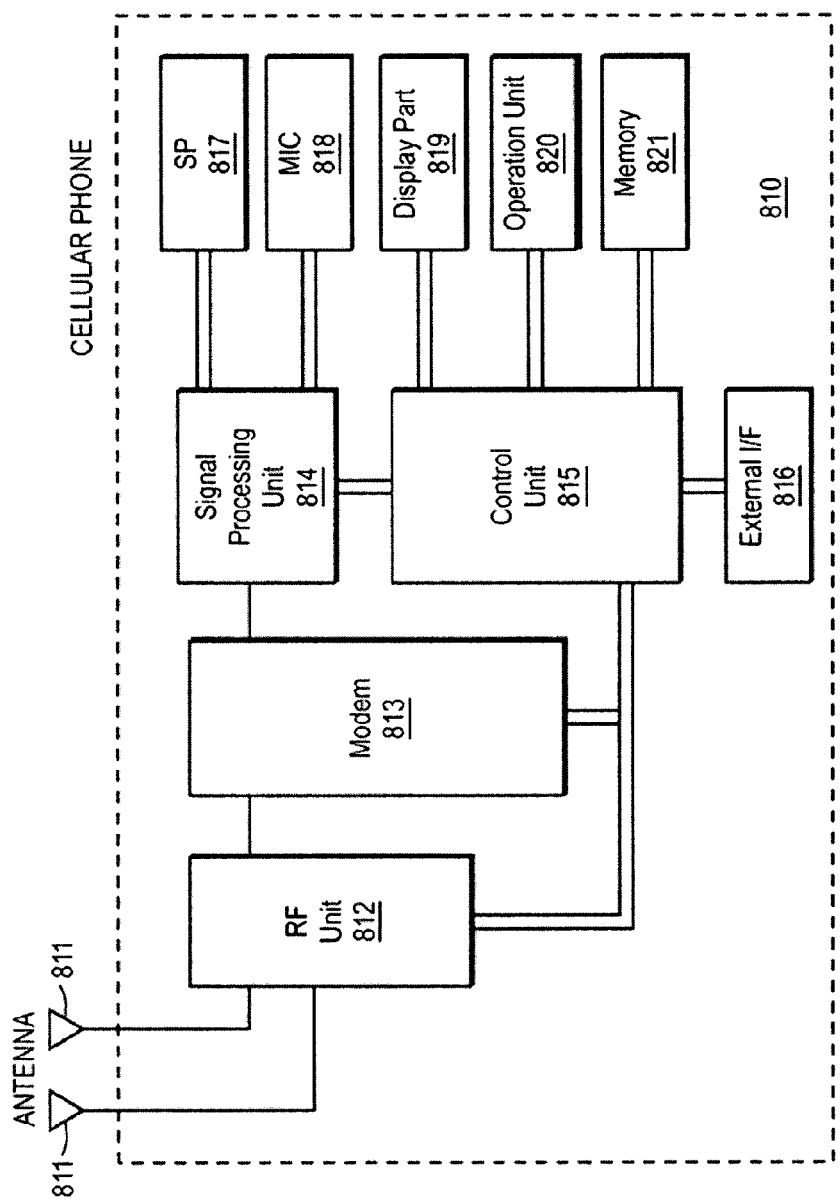
FIG. 10 is a block diagram of one embodiment of a mobile device.

FIG. 10 is a block diagram of one embodiment of a mobile device (e.g., mobile phone) that includes a transmitter and/or the receiver. Referring to FIG. 10, the mobile device 810 includes an antenna 811, a radio-frequency transceiver (an RF unit) 812, a modem 813, a signal processing unit 814, a control unit 815, an external interface unit (external I/F) 816, a speaker (SP) 817, a microphone (MIC) 818, a display unit 819, an operation unit 820 and a memory 821. In one embodiment, the external I/F 816 includes an external interface (external I/F), a CPU (Central Processing Unit), a display unit, a keyboard, a memory, a hard disk and a CD-ROM drive. The CPU and the control unit 815 in cooperation with the memories of mobile device 810 (e.g., memory 821, memory, and hard disk of the external I/F 816) cooperate to perform the operations described above. Note that the transmitter and/or receiver may be included in other wireless devices (e.g., a wireless LAN).

In one embodiment, the memories of mobile device 810 (e.g., memory 821, memory, and hard disk of the external I/F 816) store the application that is launched to allow the mobile device to create, join, leave and rejoin a wireless mesh network, as well as display the user interface and allow the user to interact with the user interface as described herein.

In one embodiment, the external I/F can be connected to a notebook, laptop, desktop or other computer. This can enable the user terminal to act as a wireless modem for the computer. The user terminal can be the computer's connection to the Internet, WiFi and WiMAX, a local area network, a wide area network, a personal area network, Bluetooth.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method for use with a plurality of mobile devices, the method comprising:
   launching an application on a first mobile device;
   joining a wireless mesh network with the first mobile device being a node in the wireless mesh network in response to launching the application;
   discovering one or more other mobile devices that are active in the wireless mesh network using a discovery protocol;
   receiving profile information from, and performing data exchanges with, each of the one or more other mobile devices using the wireless mesh network exclusively;
   displaying a visual directory of participants associated with the one or more other mobile devices active in the wireless mesh network; and
   at least two mobile devices of the one or more other mobile devices becoming inactive in the wireless mesh network without breaking a proximity network between the first mobile device and mobile devices of the one or more other mobile devices other than the at least two mobile devices, the at least two mobile devices forming a first group that is in a shared wireless mesh network together and the first mobile device and the mobile devices of the one or more other mobile devices other than the at least two mobile devices forming a second group that is in a third wireless mesh network together.

2. The method defined in claim 1 wherein discovering the one or more other mobile devices occurs only if each of the one or more other mobile devices is within a predetermined distance of the first mobile device.

3. The method defined in claim 1 wherein joining the wireless mesh network with the first mobile device being a node in the wireless mesh network comprises advertising, by the first mobile device, its presence in the wireless mesh network.

4. The method defined in claim 1 further comprising:
   at least one of the one or more other mobile devices becoming inactive in the wireless mesh network without breaking a proximity network between the first mobile device and mobile devices of the one or more other mobile devices other than the at least one mobile device.

5. The method defined in claim 1 further comprising rejoining the first group and the second group into a single wireless mesh network when mobile devices in the first and second groups are within a predetermined distance of each other.

6. The method defined in claim 1 further comprising:
   selecting a thumbnail image of one participant from the visual directory;
   displaying a contact page of the one participant.

7. The method defined in claim 6 wherein the contact page includes the thumbnail image, a person's name and a list of one or more options for contacting the person.

8. The method defined in claim 7, wherein the list includes a chat option, and further comprising initiating a chat session with one of the participants by selecting the chat option from the list.

9. The method defined in claim 1, further comprising displaying a user interface option to send a message to all participants in the visual directory.

10. The method defined in claim 1 wherein the visual directory displays thumbnail images of users in a grid that may be scrolled up and down by a user to view the participants.

11. The method defined in claim 10 wherein the visual directory displays the thumbnail images of the users in the grid that may be scrolled up and down by the user to view thumbnail images of the participants.

12. The method defined in claim 1 wherein the visual directory displays thumbnail images of users in a carousel view that allows a user to flip through thumbnail images of the participants.

13. The method defined in claim 1 further comprising displaying a user interface that contains a search entry location to search profile information of the participants.

14. The method defined in claim 1 further comprising:
obtaining received signal strength information of the one or more other mobile devices; and
sorting the visual directory based on the received signal strength information of the one or more other mobile devices.

15. A non-transitory computer-readable storage medium having instructions stored therein, which when executed by a first mobile device, cause the first mobile device to perform a method comprising:
launching an application on the first mobile device;
joining a wireless mesh network with the first mobile device being a node in the wireless mesh network in response to launching the application;
discovering one or more other mobile devices that are active in the wireless mesh network using a discovery protocol;
receiving profile information from, and performing data exchanges with, each of the one or more other mobile devices using the wireless mesh network exclusively;
displaying a visual directory of participants associated with the one or more other mobile devices active in the wireless mesh network; and
at least two mobile devices of the one or more other mobile devices becoming inactive in the wireless mesh network without breaking a proximity network between the first mobile device and mobile devices of the one or more other mobile devices other than the at least two mobile devices, the at least two mobile devices forming a first group that is in a shared wireless mesh network together and the first mobile device and the mobile devices of the one or more other mobile devices other than the at least two mobile devices forming a second group that is in a third wireless mesh network together.

16. A wireless mesh network having a plurality of mobile devices that communicate with each other without using a central server, wherein one of the mobile devices joins the mesh network by sending announcement messages that announce its presence and discovers other mobile devices in the plurality of mobile devices, and further wherein the one mobile device is operable to:
receive profile information from, and performing data exchanges with, the other mobile devices using the wireless mesh network exclusively;
display a visual directory of participants associated with the other mobile devices active in the wireless mesh network;
select a thumbnail image of one participant from the visual directory; and
display a contact page of the one participant;
wherein at least two mobile devices becomes inactive in the wireless mesh network without breaking the wireless mesh network between the one mobile device and mobile devices that remain in the wireless mesh network, and further wherein the at least two mobile devices form a first group and the one mobile device and the mobile devices that remain form a second group, the first and second groups being separate wireless mesh networks.

17. The network defined in claim 16 wherein the contact page includes the thumbnail image, a person's name and a list of one or more options for contacting the person.

18. The network defined in claim 16 wherein at least one of the other mobile devices becomes inactive in the wireless mesh network without breaking the wireless mesh network between the one mobile device and mobile devices that remain active in the wireless mesh network.

19. The network defined in claim 16 wherein the first and second groups are rejoined into a single wireless mesh network when mobile devices in the first and second groups are within a predetermined distance of each other.

* * * * *